US010900352B2

(12) United States Patent
Vannuffelen et al.

(10) Patent No.: US 10,900,352 B2
(45) Date of Patent: Jan. 26, 2021

(54) WIRELESS ACOUSTIC COMMUNICATION APPARATUS AND RELATED METHODS

(71) Applicant: Schlumberger Technology Corporation, Sugar Land, TX (US)

(72) Inventors: Stephane Vannuffelen, Cambridge, MA (US); Christophe M. Rayssiguier, Clamart (FR); Arnaud Croux, Boston, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/471,347

(22) PCT Filed: Dec. 19, 2016

(86) PCT No.: PCT/US2016/067415
§ 371 (c)(1),
(2) Date: Jun. 19, 2019

(87) PCT Pub. No.: WO2018/118000
PCT Pub. Date: Jun. 28, 2018

(65) Prior Publication Data
US 2020/0088027 A1 Mar. 19, 2020

(51) Int. Cl.
*E21B 47/16* (2006.01)
*G01K 11/00* (2006.01)
(Continued)

(52) U.S. Cl.
CPC .......... *E21B 47/16* (2013.01); *E21B 17/1078* (2013.01); *E21B 47/017* (2020.05); *G10K 11/002* (2013.01); *G10K 11/004* (2013.01)

(58) Field of Classification Search
None
See application file for complete search history.

(56) References Cited

U.S. PATENT DOCUMENTS 4,125,163 A * 11/1978 Fitzpatrick .............. G05D 9/12 166/250.03
4,283,780 A 8/1981 Nardi
(Continued)

FOREIGN PATENT DOCUMENTS

WO 2014100276 A1 6/2014
WO 2015041951 A1 3/2015

OTHER PUBLICATIONS

International Preliminary Report on Patentabitliy issued in the related PCT Application PCT/US2016/0674715, dated Jul. 4, 2019 (12 pages).

(Continued)

*Primary Examiner* — Curtis A Kuntz
*Assistant Examiner* — Jerold B Murphy
(74) *Attorney, Agent, or Firm* — Cameron R. Sneddon

(57) ABSTRACT

Wireless acoustic communication apparatus and related methods are disclosed herein. An example apparatus includes a first rod and a second rod. The first rod and the second rod are to form a rod string. The example apparatus includes a first acoustic repeater mechanically coupled to the first rod. The first acoustic repeater is to communicate with a second acoustic repeater to convey data via the rod string. The second acoustic repeater is to receive the data from a first tool.

14 Claims, 8 Drawing Sheets

(51) Int. Cl.

| | |
|---|---|
| ***E21B 17/10*** | (2006.01) |
| ***G10K 11/00*** | (2006.01) |
| ***E21B 47/017*** | (2012.01) |

(56) References Cited

U.S. PATENT DOCUMENTS

| | | | | |
|---|---|---|---|---|
| 2008/0030367 | A1 | 2/2008 | Fink et al. | |
| 2014/0158347 | A1 * | 6/2014 | Fielder .................. | E21B 47/009<br>166/250.01 |
| 2014/0286130 | A1 | 9/2014 | Rayssiguier et al. | |
| 2015/0285066 | A1 * | 10/2015 | Keller ................. | E21B 17/1078<br>367/82 |
| 2016/0043753 | A1 * | 2/2016 | Jungnickel .............. | E21B 47/16<br>375/295 |
| 2018/0045032 | A1 * | 2/2018 | Suermondt ............. | E21B 17/00 |

OTHER PUBLICATIONS

Drumheller, Acoustical Properties of drill strings, J Acous Soc Am. 85(3), Mar. 1989 (18 pages).

International search report and Written Opinion issued in the related PCT Application PCT/US2016/0674715, dated Sep. 7, 2017 (13 pages).

* cited by examiner

WIRELESS ACOUSTIC COMMUNICATION APPARATUS AND RELATED METHODS

BACKGROUND

This disclosure relates generally to wireless acoustic communication and, more particularly, to wireless acoustic communication apparatus and related methods.

DESCRIPTION OF THE RELATED ART

Wireless acoustic telemetry includes transmission of acoustic signals between a network of repeater nodes that wirelessly receive and send messages included in the signals. In a downhole environment such as a wellbore, wireless acoustic telemetry can be used when communication via a cable (e.g., a wireline cable) is not available due to, for example, an obstruction in the wellbore. One or more acoustic repeaters can interface with downhole equipment to transmit data between the surface and the equipment. A message generated by an acoustic repeater in the form of an acoustic wave signal is propagated across the repeater network via a propagation medium, such as a production pipe to which the repeater is coupled. Signal modulation can be used to transmit data to, for example, the surface via a communication channel provided by the propagation medium.

In some examples, production tubing may not be deployed downhole. In such examples, a communication channel may not be available for implementation of a wireless acoustic telemetry system in a downhole environment.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

An example apparatus includes a first rod and a second rod. The first rod and the second rod are to form a rod string. The example apparatus includes a first acoustic repeater mechanically coupled to the first rod. The first acoustic repeater is to communicate with a second acoustic repeater to convey data via the rod string. The second acoustic repeater is to receive the data from a first tool.

An example method includes deploying, by executing an instruction with a processor, a rod string in a wellbore. The rod string includes a first acoustic repeater. The example method includes communicating, by executing an instruction with the processor and via the first acoustic repeater, with a second acoustic repeater. The second acoustic repeater is associated with a first tool disposed in the wellbore. The second acoustic repeater is to transmit first data to the first acoustic repeater via the rod string. The example method includes transmitting, by executing an instruction with the processor, the first data from the first acoustic repeater to the processor.

An example method includes mechanically coupling an acoustic repeater to a first rod and mechanically coupling the first rod to a second rod to form a rod string. The rod string is to propagate a signal associated with the acoustic repeater via the coupling of the acoustic repeater and the first rod and the coupling of the first rod and the second rod.

Various refinements of the features noted above may exist in relation to various aspects of the present embodiments. Further features may also be incorporated in these various aspects as well. These refinements and additional features may exist individually or in any combination. For instance, various features discussed below in relation to the illustrated embodiments may be incorporated into any of the above-described aspects of the present disclosure alone or in any combination. Again, the brief summary presented above is intended just to familiarize the reader with certain aspects and contexts of some embodiments without limitation to the claimed subject matter.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
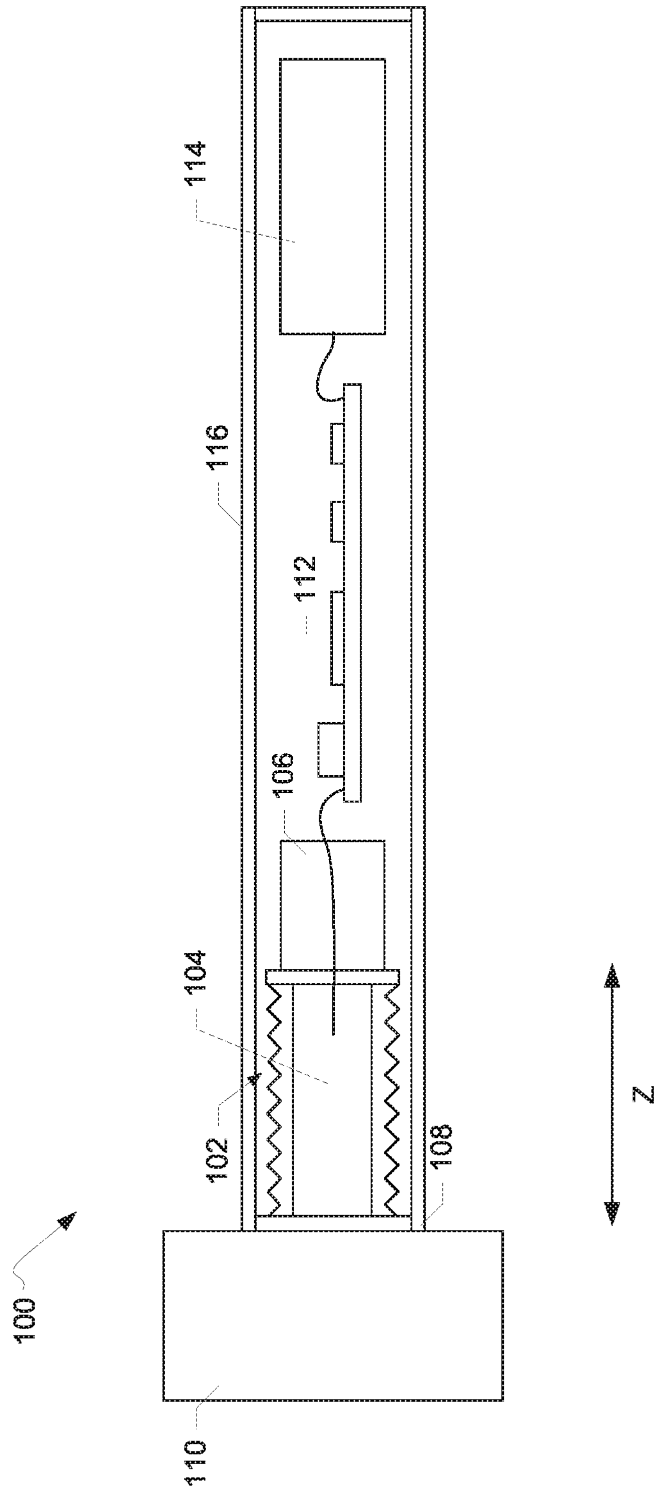
FIG. 1 illustrates an example acoustic repeater in accordance with the teachings disclosed herein.

It is to be understood that the present disclosure provides many different embodiments, or examples, for implementing different features of various embodiments. Specific examples of components and arrangements are described below for purposes of explanation and to simplify the present disclosure. These are, of course, merely examples and are not intended to be limiting.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not mandate any particular orientation of the components.

Wireless telemetry enables communication between equipment disposed in a wellbore and the surface. For example, wireless telemetry enables communication across obstructions such as pressure barriers or in other situations in which downhole communication via a wireline cable may not be feasible. Wireless telemetry can be used to provide operational control of and communication with equipment located below the obstructions. Examples of wireless telemetry include acoustic telemetry or electromagnetic telemetry.

An example wireless acoustic telemetry system includes two or more acoustic repeater nodes that send and receive messages in the form of acoustic signals across a wireless network formed by the repeaters, or a network that does not use a cable (e.g., a wireline cable) as a communication medium. Some of the acoustic repeaters of the wireless network are end repeater nodes that interface with one or more downhole tool(s) such as pressure gauges or other sensors. Thus, the downhole tool(s) are wireless-enabled tool(s) in that communication can be established with the tool(s) without the use of a wireline cable. Production pipe, drill pipe, wellbore casing, and/or borehole fluid can be used as transmission media for propagating the acoustic signals across the wireless repeater network. For example, the repeaters can be coupled to production piping that propagates the acoustic signals containing information to be transmitted to and from the surface via the repeaters. A surface repeater node can be coupled to a surface computer (e.g., via a wired connection) to provide a communication interface between the surface and the downhole tools interfaced with the end repeater nodes.

Although wireless acoustic telemetry enables communication between different locations in a wellbore and/or between a downhole location and the surface, in some examples, production piping is not available in the wellbore. In such examples, implementation of a wireless acoustic telemetry system may not be practical or feasible. For example, a well may be temporarily suspended from production use and, thus, the production tubing may be removed from the well. As a result, the wellbore may no longer include a propagation medium to which the repeaters of the wireless acoustic telemetry system can be coupled for transmission of the acoustic signals.

A suspended well may still require monitoring with respect to downhole conditions. For example, the well can be plugged with one or more mechanical plugs that create pressure barriers in the well. Although the well is suspended from production use, monitoring of the conditions in the well below the pressure barriers may be desirable or, in some countries, required, to insure the integrity of the plug(s) with respect to preventing leakage. A suspended well may also be monitored to check for abnormal pressure build-up below the plug(s).

Interference testing between two or more wells can be used to monitor pressure variations in a suspended well. For example, one or more pressure gauges can be deployed in a first well prior to suspension of the first well. A rate of production in a second well (e.g., an adjacent well relative to the first well) can be changed. The pressure gauges in the first well are monitored to identify changes in pressure at the first well due the change in production at the second well. However, interference testing is inefficient as it can take time for production at the second well to measurably affect pressure at the first well.

Example apparatus, systems, and methods disclosed herein provide for wireless acoustic communication between two or more locations in a wellbore using a solid conductor string rather than production piping. In some disclosed examples, the solid conductor string includes a string of mechanically coupled metal rods. One or more acoustic repeaters are mechanically coupled to the rod string. The mechanical coupling of a repeater to the rod string enables transmission of an acoustic signal generated by the repeater to the rod string and from the rod string to other repeater(s), tool(s), the surface, etc. Thus, in some disclosed examples, the rod string serves as a propagation medium for the transmission of acoustic signals between the repeater(s) and the surface.

Disclosed example rod strings can be deployed in a well without production tubing, such as a suspended well. Disclosed example rod strings provide a communication path or medium by which acoustic signals can be transmitted between repeaters coupled to the example rod strings and/or to the surface. Thus, some disclosed example rod strings and repeaters enable the use of wireless acoustic telemetry in examples where production piping is not available to serve as a communication channel between repeaters. Although examples disclosed herein are discussed in the context of communication the surface and between one or more tools disposed in a wellbore, the examples disclosed herein can be implemented in other environments in which a wireless acoustic telemetry system is used for communication.

FIG. 1 illustrates an example acoustic repeater 100. The example repeater 100 of FIG. 1 includes an acoustic transducer 102 for receiving and transmitting acoustic signals. The transducer 102 of the example repeater 100 of FIG. 1 includes a linear actuator 104. The actuator 104 can be a piezoelectric actuator such that the actuator 104 expands or retracts (e.g., in the Z direction of FIG. 1) in response to electrical excitation. In other examples, the actuator 104 can be a magnetostrictive actuator. A backing mass 106 is coupled to the actuator 104 to tune a resonance frequency of the transducer 102 and/or adjust the resonance frequency to be within a predefined frequency range. A face 108 of the transducer 102 is mechanically coupled to a transmission medium 110 via one or more connectors (e.g., male or female connectors) of the example repeater 100, as will be disclosed below. As will also be disclosed below, the transmission medium 110 enables transmission of acoustic signals to and from the example repeater 100.

The example repeater 100 of FIG. 1 also includes electronics 112. The electronics 112 of the example repeater 100 can include a microcontroller for modulating signals (e.g., phase and/or amplitude modulation), an amplifier, and/or other components for processing signals for transmission via the transmission medium 110. The example repeater 100 includes a power source 114, such as a battery. The acoustic transducer 102, the electronics 112, and the power source 114 are disposed in a housing 116 of the example repeater 100 of FIG. 1. In some examples, the acoustic transducer 102, the electronics 112, and/or the power source 114 are disposed in two or more housings 116 coupled together.

As disclosed above, the example repeater 100 of FIG. 1 is mechanically coupled to the transmission medium 110. In disclosed examples, the transmission medium 110 includes at least one rod of a rod string to which the example repeater 100 is coupled via one or more connectors. The connectors of the example repeater 100 can include female connectors, male connectors, or a combination thereof. The rod(s) can be made of metal or another material capable of transmitting acoustic signals. In disclosed examples, the rod string enables transmission of acoustic signals via propagation of extensional (e.g., longitudinal) waves, torsional waves, and/ or shear (e.g., transverse) waves generated by the example repeater 100 along rods of the rod string.

Figure 2A:
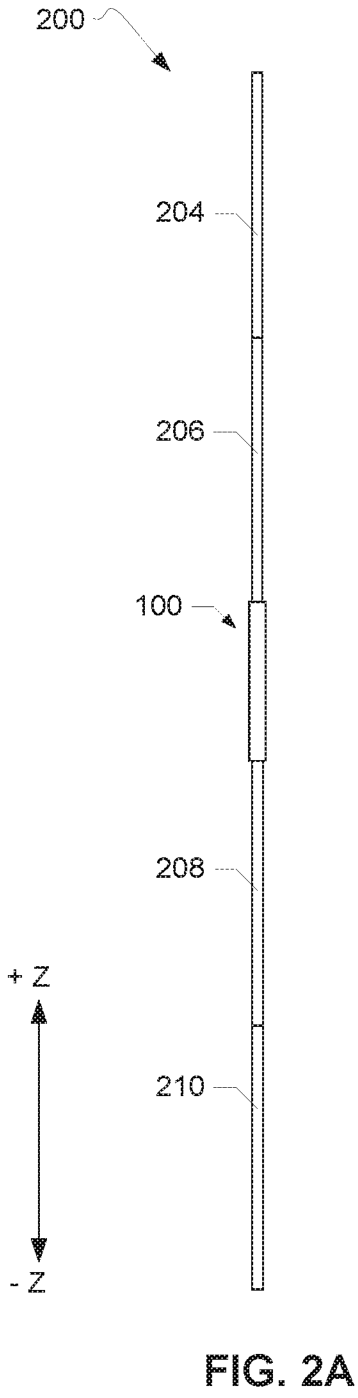
FIG. 2A illustrates a first example rod string including the example acoustic repeater of FIG. 1 coupled thereto in accordance with the teachings disclosed herein.
Figure 2B:
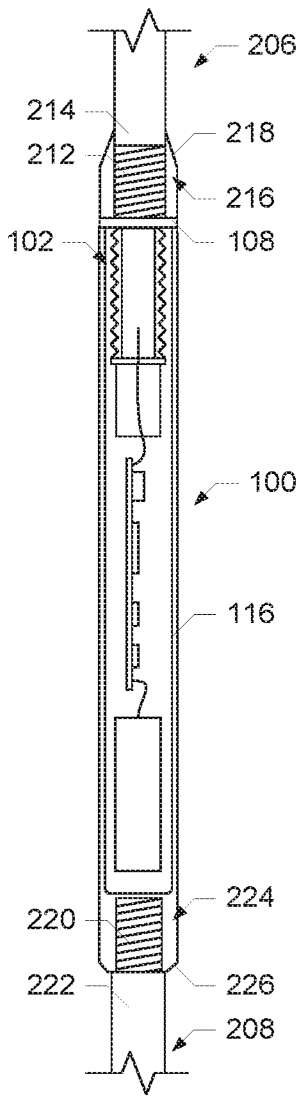
FIG. 2B is a partial view of the first example rod string of FIG. 2A including the example repeater of FIG. 1.

FIGS. 2A and 2B illustrate a first example rod string 200 including the example acoustic repeater 100 of FIG. 1 coupled to the rod string 200 in an in-line configuration. As illustrated in FIG. 2A, the example rod string 200 includes a first rod 204, a second rod 206, a third rod 208, and fourth rod 210. The example rod string 200 can include additional or fewer rods than illustrated in FIG. 2A. In the example rod string 200 of FIGS. 2A and 2B, the first, second, third, and fourth rods 204, 206, 208, 210 are metal rods. However, any one of the rods of the example rod string 200 of FIGS. 2A and 2B can include other materials that allow for propagation of signals.

In the first example rod string 200 of FIGS. 2A and 2B, the example repeater 100 is mechanically coupled to the second rod 206 and the third rod 208. Thus, in the example rod string 200 of FIGS. 2A and 2B, the example repeater 100 is inserted into the rod string 200 such that the example repeater 100 replaces one of the rods of the rod string 200 (e.g., a rod that would be coupled between the second rod 206 and the third rod 208). As illustrated in FIGS. 2A and 2B, the example repeater 100 is substantially aligned with the first, second, third, and fourth rods 204, 206, 208, 210 (e.g., along a longitudinal axis extending through the rod string 200). The example repeater 100 can be coupled between other rods of the example rod string 200, such as between the first rod 204 and the second rod 206. Also, the first example rod string 200 can include other repeaters and/or tools (e.g., sensors, gauges) coupled thereto.

As illustrated in FIG. 2B, the example repeater 100 and the second rod 206 are mechanically coupled. For example, a male connector 212 at a first end 214 of the second rod 206 is coupled to first female connector 216 defined at a first end 218 of the example repeater 100. The coupling can be a threaded coupling, as illustrated in FIG. 2B, or another type of coupling (e.g., an inference fit, coupling via a chemical fastener). In some examples, the first female connector 216 of the example repeater 100 is formed from a portion of the housing 116 of the example repeater 100. In other examples, the first end 214 of the second rod 206 has a female connector and the first end 218 of the example repeater 100 has a male connector.

As a result of the coupling of the example repeater 100 to the second rod 206 as illustrated in FIGS. 2A and 2B, the face 108 of the acoustic transducer 102 is in substantially direct contact with the first end 214 of the second rod 206. The mechanical coupling of the example repeater 100 and the second rod 206 of the first example rod string 200 enables transmission of an extensional wave generated by the example repeater 100 to the example rod string 200 (e.g., in the +Z direction relative to the surface). For example, as a result of the substantially direct contact between the face 108 of the acoustic transducer 102 and the second rod 206, an extensional wave generated by the example repeater 100 is transferred to the second rod 206 for propagation to the surface along the first example rod string 200 via the first and second rods 204, 206 (e.g., in the +Z direction relative to the surface). Thus, the mechanical coupling of the example repeater 100 to the second rod 206 provides for acoustic coupling of the repeater 100 and the second rod 206 that enables the transfer of acoustic signals between the repeater 100 and the second rod 206.

As also illustrated in FIG. 2B, the example repeater 100 is mechanically coupled to the third rod 208. For example, a male connector 220 at a first end 222 of the third rod 208 is mechanically coupled to second female connector 224 defined at a second end 226 of the example repeater 100 (e.g., an end opposite the first end 218) via, for example, a threaded coupling. In some examples, the second female connector 224 of the example repeater 100 is formed from a portion of the housing 116 of the example repeater 100. In other examples, the first end 222 of the third rod 208 includes a female connector and the second end 226 of the example repeater 100 includes a male connector. The mechanical coupling and, thus the acoustic coupling, of the example repeater 100 and the third rod 208 of the first example rod string 200 enables transmission of an acoustic wave generated by the example repeater 100 to, for example, a downhole tool such as a gauge, via the example rod string 200 (e.g., in the −Z direction relative to the surface).

Thus, the first example rod string 200 of FIGS. 2A and 2B includes the example repeater 100 substantially integrated or embedded in the rod string 200. In other examples, the example repeater 100 of FIG. 1 is coupled to a rod string such that the repeater 100 is substantially parallel to the rods of the rod string.

Figure 3B:
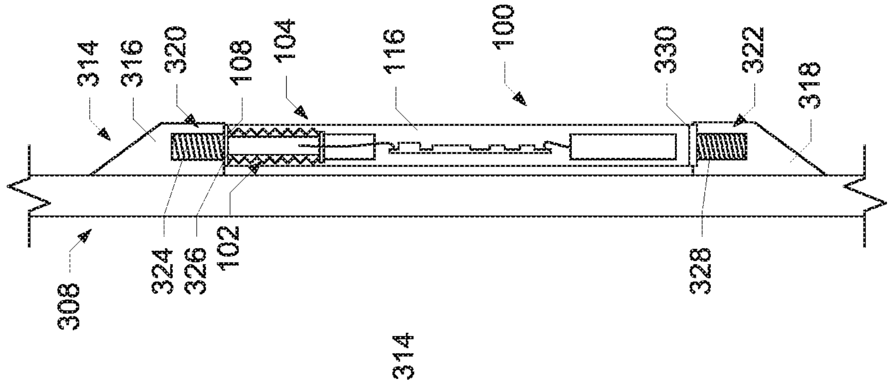
FIG. 3B is a partial view of the first example rod string of FIG. 3A including the example repeater of FIG. 1.
Figure 3A:
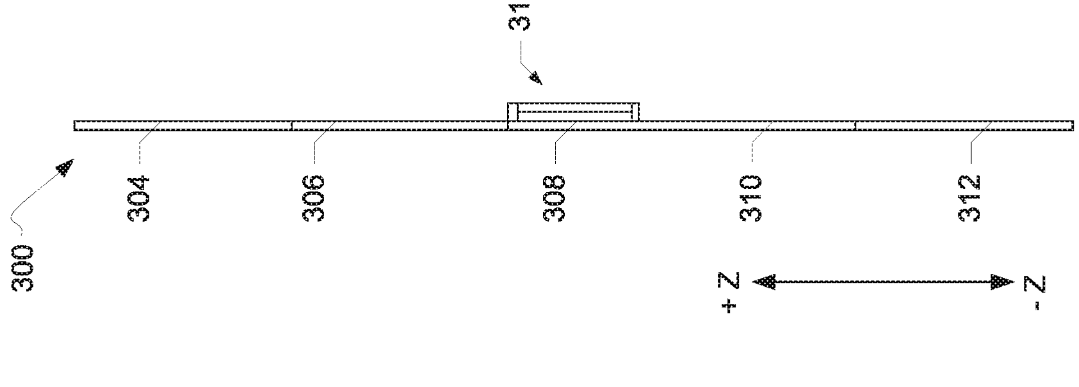
FIG. 3A illustrates a second example rod string including the example acoustic repeater of FIG. 1 coupled thereto in accordance with the teachings disclosed herein.

FIGS. 3A and 3B illustrate a second example rod string 300 including the example acoustic repeater 100 of FIG. 1 coupled to the rod string 300 in an in-parallel configuration. The example rod string 300 includes a first rod 304, a second rod 306, a third rod 308, a fourth rod 310, and a fifth rod 312. The example rod string 300 can include additional or fewer rods than illustrated in FIG. 3A. In the example rod string 300 of FIG. 3A, the first, second, third, fourth, and fifth rods 304, 306, 308, 310, 312 are metal rods. However, any one of the rods of the example rod string 300 of FIGS. 3A and 3B can include other materials that allow for propagation of acoustic signals.

In the example of FIGS. 3A and 3B, the example repeater 100 is coupled to the rod string 300 via a clamp 314. As shown in FIGS. 3A and 3B, the clamp 314 is coupled (e.g., mechanically or chemically fastened) to the third rod 308 and the example repeater 100 is coupled to the third rod 308 via the clamp 314. The example rod string 300 can include additional clamps and/or clamp(s) located at other positions along the rod string 300 than shown in FIGS. 3A and 3B. Also, the example rod string 300 of FIGS. 3A and 3B can include additional repeaters coupled to the clamps.

The clamp 314 includes a first clamp portion 316 and a second clamp portion 318. As illustrated in FIG. 3B, the first clamp portion 316 defines a first female connector 320 and the second clamp portion 318 defines a second female connector 322. In other examples, the first clamp portion 316 and/or the second clamp portion 318 can include a male connector.

In the example of FIG. 3B, the example repeater 100 includes a first male connector 324 at a first end 326 of the repeater 100. In the example of FIG. 3B, the first male connector 324 is mechanically coupled to the first female connector 320 of the first clamp portion 316 of the clamp 314 via, for example, a threaded connection. In other examples, the first end 326 of the example repeater 100 includes a female connector (e.g., in examples where the first claim portion 316 of the clamp 314 includes a male connector).

As also illustrated in FIG. 3B, the example repeater 100 includes a second male connector 328 at a second end 330 of the repeater 100 opposite the first end 326. In the example of FIG. 3B, the second male connector 328 is mechanically coupled to the second female connector 322 of second clamp portion 318 of the clamp 314 via, for example, a threaded connection. In other examples, the second end 330 of the example repeater 100 includes a male connector (e.g., in examples where the first claim portion 318 of the clamp 314 includes a female connector).

Thus, when the example repeater 100 is coupled to third rod 308 via the clamp 314, the example repeater 100 is substantially parallel to the rods 304, 306, 308, 310, 312 of the example rod string 300. Put another way, a longitudinal axis extending through the example repeater 100 is parallel to a longitudinal axis extending through the rods 304, 306, 308, 310, 312 of the example rod string 300 when the example repeater 100 is coupled to the third rod 308 via the clamp 314. The coupling of the example repeater 100 to the third rod 308 via the first and second clamp portions 316, 318 of the clamp 314 provides for (1) a substantially rigid connection between the face 108 of the acoustic transducer 102 of the example repeater 100 and the clamp 314 and (2) a substantially rigid connection between the example repeater 100 and the third rod 308 via the clamp 314. The coupling of the example repeater 100 to the rod string 300 via the clamp 314 enables the transfer of acoustic signals generated by the repeater 100 to the third rod 308 and, thus, the example rod string 300 for transmission of the signals to other repeaters, tools, and/or the surface.

FIGS. 2A, 2B, 3A, and 3B illustrate the coupling of an acoustic repeater to a rod string including two or more rods. The example rod strings 200, 300 of FIGS. 2 and 3 can include a plurality of acoustic repeaters coupled to the respective rod strings 200, 300 based on, for example, the in-line configuration illustrated in FIGS. 2A and 2B, the in-parallel configuration illustrated in FIGS. 3 and 3B, or a combination of the in-line configuration and the in-parallel configuration of FIGS. 2A, 2B and 3. As disclosed above, the example acoustic repeater 100 of FIGS. 1-3B generates acoustic signals containing data to be communicated between repeaters, downhole tool(s), and/or the surface via the propagation of the acoustic signals by the example rod strings 200, 300. The electronics 112 of the example acoustic repeater 100 (e.g., a microcontroller) can be used to modulate a phase and/or an amplitude of one or more carrier signals to communicate the signal between the example acoustic repeater 100 and other repeaters. Thus, a wireless communication network, or a network that does not use a cable (e.g., a wireline cable) as a communication medium, is formed by coupling one or more repeaters to the respective rod strings 200, 300 to enable transmission of data via one or more acoustic signals. The message(s) included in the acoustic signal(s) can be received at the surface by a surface node. In other examples, the message(s) are received by one or more downhole tools (e.g., pressure gauges).

The rods 204, 206, 208, 210, 304, 306, 308, 310, 312 of the example rod strings 200, 300 serve as propagation media for transmitting acoustic signals along the rod strings 200, 300. The rods 204, 206, 208, 210, 304, 306, 308, 310, 312 can receive acoustic signals including messages from the repeater(s) 100 or deliver acoustic signals including messages to the repeater(s) 100 as a result of the coupling between the repeater(s) 100 and the rods strings 200, 300. Each rod 204, 206, 208, 210, 304, 306, 308, 310, 312 of the respective rod strings 200, 300 is coupled to at least one other rod of the respective rod strings 200, 300, which allows for propagation of the acoustic waves along the rod strings 200, 300.

Figure 4:
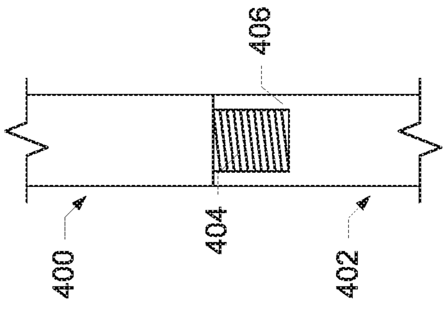
FIG. 4 illustrates an example connection between two rods of a rod string in accordance with the teachings disclosed herein.

FIG. 4 illustrates an example coupling between a first rod 400 and a second rod 402 of a rod string. The first and second rods 400, 402 can be any of the rods 204, 206, 208, 210 of the example rod string 200 of FIG. 2A in adjacency (e.g., the first rod 204 and the second rod 206 as illustrated in FIGS. 2A and 2B). In other examples, the first and second rods 400, 402 can be any two of the rods 304, 306, 308, 310, 312 of the example rod string 300 of FIG. 3A in adjacency (e.g., the first rod 304 and the second rod 306 as illustrated in FIG. 3A).

The example first rod 400 of FIG. 4 includes a male connector 404 and the example second rod 402 of FIG. 4 includes female connector 406. In other examples, the first rod 400 includes the female connector and the second rod 402 includes the male connector. The male connector 404 of the first rod 400 is coupled to the female connector 406 of the second rod 402 via, for example, a threaded coupling or other type of coupling (e.g., an interference fit, coupling via a chemical fastener).

The male-to-female coupling of the first and second rods 400, 402 substantially reduces a change in a diameter of the rod string at a portion of the rod string where the first and second rods 400, 402 connect as compared to if the first and second rods 400, 402 were coupled via a separate connector (e.g., a coupling). For example, if each of the first and second rods 400, 402 included ends having male connectors, a separate connector having two female connectors could be used to couple the first and second rods 400, 402. However, such a separate connector would cause a change in diameter of the rod string due to the separate connector (e.g., a diameter of the rod string would increase at the separate connector). The change in diameter of the rod string due to the separate connector could affect the transmission of acoustic signals between first and second rods 400, 402. For example, the change in diameter could affect an acoustic impedance of the rod string at the separate connector. The change of diameter could cause reflection of the acoustic signal, which could cause an echo in the rod string that distorts the acoustic signal. If there are multiple rod-to-rod connections via separate connectors that result in changes of diameter along the rod string, then multiple echoes may travel along the rod string, which further distorts the acoustic signal as the signal travels along the rod string The male-to-female connection of the rods 400, 402 illustrated in FIG. 4 provides for a substantially uniform cross section between the first and second rods 400, 402 at the connection of the two rods 400, 402 relative to a remainder of the rod string. Thus, the male-to-female connection minimizes a change in diameter of the rod string where the first and second rods 400, 402 connect. The substantially uniform cross section reduces or minimizes signal distortion due to echoes as the acoustic wave travels between the first and second rods 400, 402.

Thus, as disclosed above in connection with FIGS. 1-4, a rod string (e.g., the example rod strings 200, 300) including one or more repeaters (e.g., the example repeater 100) coupled thereto facilitates a wireless communication network between the repeater(s), tools interfaced with the repeater(s), and/or the surface. The rods of the rod string serve as a solid conductor that can be used to propagate acoustic signals across the network and to deliver and receive messages included in the signals from the repeater (s), the tool(s), the surface, etc. The rods can be coupled as disclosed above in the example of FIG. 4 to minimize distortion of the acoustic signals as the signals travel along the rod string.

Figure 5:
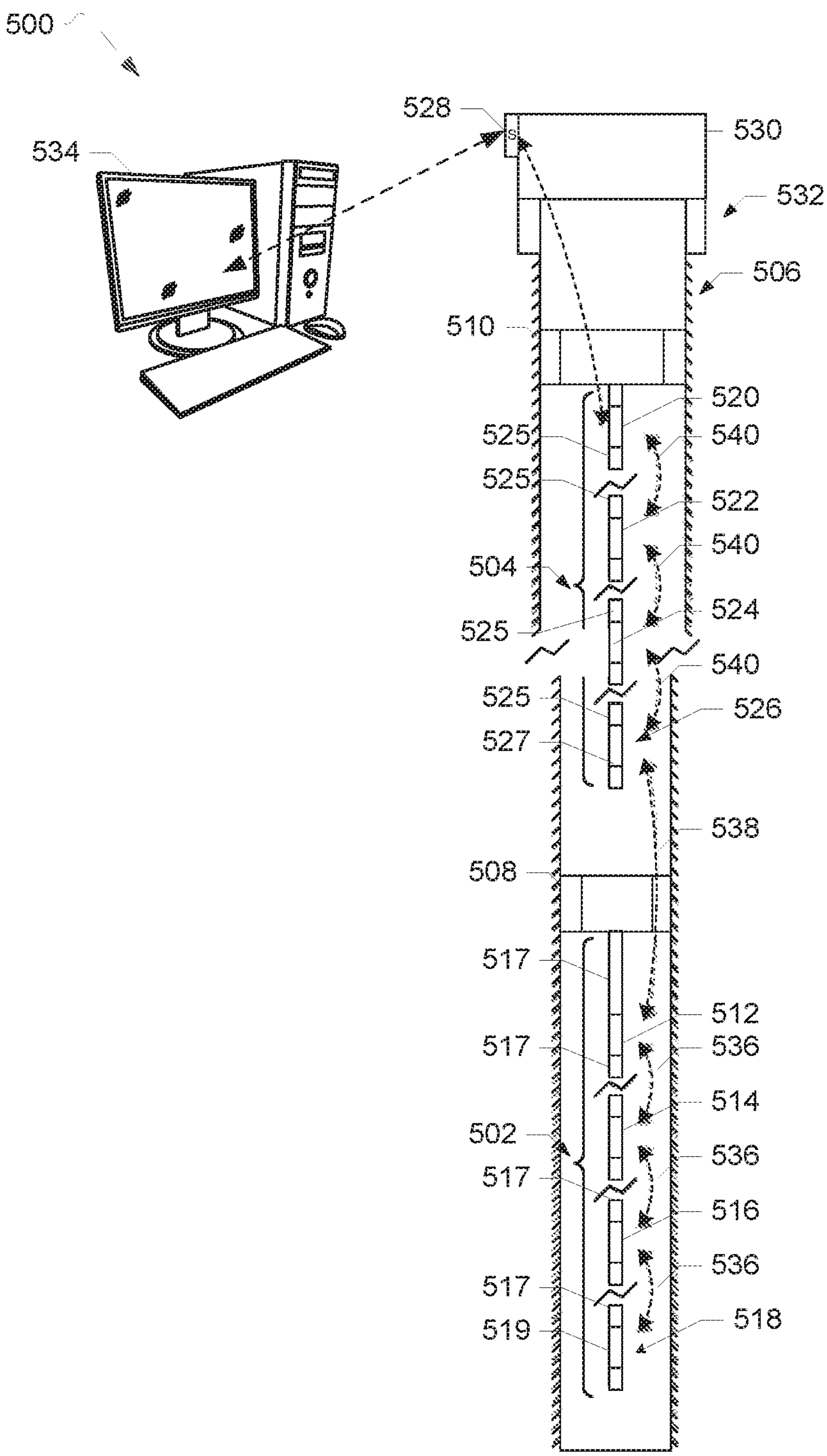
FIG. 5 illustrates a first example wireless acoustic telemetry system in accordance with the teachings disclosed herein.

FIG. 5 illustrates a first example wireless acoustic telemetry system 500 including a first rod string 502 and a second rod string 504 disposed in a wellbore 506 for communication between one or more tools disposed in the wellbore 506 and the surface. The example wellbore 506 of FIG. 5 is a wellbore that has been suspended from production and does not contain production tubing. The wellbore 506 is plugged with a first plug 508 and a second plug 510. The example wellbore 506 can include additional or fewer plugs than illustrated in FIG. 5. The first and second plugs 508, 510 act as pressure barriers in the wellbore 506. During the suspension period, it may be of interest to monitor one or more conditions of the wellbore 506 below the first and second plugs 508, 510.

In the example system 500 of FIG. 5, the first rod string 502 is mechanically coupled to the first plug 508 or disposed proximate to the first plug 508 such that the first rod string 502 is disposed below the first plug 508 in the wellbore 506 relative to the surface. The first rod string 502 of FIG. 5 includes a first repeater 512, a second repeater 514, a third repeater 516, and a fourth repeater 518 coupled thereto. The first, second, third, and/or fourth repeaters 512, 514, 516, 518 can be implemented using the example repeater 100 of FIG. 1. The first rod string 502 can include additional or fewer repeaters.

In the example system 500 of FIG. 5, the fourth repeater 518 is interfaced with or communicatively coupled to a first tool 519. Thus, the first tool 519 is a wireless-enabled tool, as communication can be established with the first tool 519 without the use of a wireline cable. In the example system 500 of FIG. 5, the first tool 519 is a pressure gauge. However, the fourth repeater 518 can interface with other types of tools, sensors, etc. Also, the other repeaters 512, 514, 516 can interface with other sensors, tools, etc.

Each of the first, second, third, and fourth repeaters 512, 514, 516, 518 of the first rod string 502 is mechanically coupled to one or more rods 517 of the first rod string 502. For example, the first repeater 512 can be coupled between two rods 517 substantially as disclosed above in connection with the in-line configuration of the first example rod string 200 of FIGS. 2A and 2B. In other examples, the first repeater 512 is coupled to one of the rods 517 via a clamp (e.g., the clamp 314) as substantially disclosed above in connection with the in-parallel configuration of the second example rod string 300 of FIGS. 3A and 3B. In the example rod string 502 of FIG. 5, the rods 517 are metal rods. However, the rods 517 could be made of other materials capable of propagating acoustic signals.

In the example system 500 of FIG. 5, the second rod string 504 is mechanically coupled to the second plug 510 or disposed proximate to the second plug 510 such that the second rod string 504 is disposed below the second plug 510 in the wellbore 506 relative to the surface. The second rod string 504 of FIG. 5 includes a fifth repeater 520, a sixth repeater 522, a seventh repeater 524, and an eighth repeater 526. The second rod string 504 can include additional or fewer repeaters. In the example system 500 of FIG. 5, the eighth repeater 526 is interfaced with or communicatively coupled to a second tool 527. Thus, the second tool 527 is a wireless-enabled tool, as communication can be established with the second tool 527 without the use of a wireline cable. In the example system 500, the second tool 527 is a second pressure gauge. The eighth repeater 526 can interface with other types of sensors, tools, etc. Also, the other repeaters 520, 522, 524 of the second rod string 504 can interface with other sensors, tools, etc.

Each of the fifth, sixth, seventh, and eighth repeaters 520, 522, 524, 526 is mechanically coupled to one or more rods 525 of the second rod string 504 (e.g., in the in-line configuration as disclosed above in connection with the first example rod string 200 of FIGS. 2A and 2B and/or in the in-parallel configuration as disclosed above in connection with the second example rod string 300 of FIGS. 3A and 3B). In the second example rod string 504, the rods 525 are metal rods. However, the rods 525 could be made of other materials capable of propagating acoustic signals.

The example system 500 of FIG. 5 includes a surface repeater 528 disposed outside the wellbore 506 at the surface. The surface repeater 528 can be mechanically coupled to surface equipment 530 disposed at a wellhead 532 of the wellbore 506. In other examples, the surface repeater 528 is disposed proximate to but spaced apart from the surface equipment 530 and/or a wellhead of the wellbore 506. The surface repeater 528 can be communicatively coupled to a computer 534 disposed at the surface via a wired or wireless (e.g., WiFi) connection.

In the example system 500, the first tool 519 associated with the fourth repeater 518 of the first rod string 502 collects data regarding pressure conditions in the wellbore 506. The pressure data collected by the first tool 519 is conveyed to the surface via the first rod string 502 and the second rod string 504 in the form of an acoustic signal containing one or more messages. For example, an acoustic signals including a first message containing pressure data is transmitted or propagated from the fourth repeater 518 to the third repeater 516 of the first rod string 502. The acoustic signal including the first message is transmitted between the first, second, and third repeaters 512, 514, 516. The rods 517 of the first example rod string 502 serve as propagation media for transmitting the first acoustic signal and, thus the first message contained therein, between the rods 517 and the first, second, third, and fourth repeaters 512, 514, 516, 518. Thus, the first message is wirelessly transmitted or conveyed across the first rod string 502 via the repeaters 512, 514, 516, 518 and the rods 517, as represented by arrows 536 in FIG. 5.

The acoustic signal including the first message containing the pressure data from the first tool 519 is transmitted from the first rod string 502, across the first plug 508, and to the second rod string 504, as represented by arrow 538 of FIG. 5. In some examples, fluid in the wellbore 506 serves as a propagation medium for wirelessly transmitting the acoustic signal including the first message across the first plug 508 from the first rod string 502 to the second rod string 504. In the example system 500, the acoustic signal including the first message containing the pressure data from the first tool 519 is transmitted to the surface repeater 528 via the fifth, sixth, seventh, and eighth repeaters 520, 522, 524, 562 of the second rod string 504, as represented by arrows 540 of FIG. 5.

The rods 525 of the second rod string 504 serve as propagation media for wirelessly transmitting the acoustic signal including the first message between the rods 525 and the repeaters 520, 522, 524, 526 of the second rod string 504, across the second plug 510, and to the surface repeater 528, as represented by the 542 of FIG. 5. In some examples, fluid in the wellbore 506 can serves as a propagation medium for transmitting the acoustic signal from the second rod string 504, across the second plug 510, and to the surface repeater 528. The surface repeater 528 transmits the signal data including the pressure data collected by the first tool 519 to the surface computer 534 for processing and analysis. In some examples, the surface computer 534 generates one or more instructions for the first tool 519 that are transmitted downhole via the surface repeater 528 and the repeaters of the first and/or second rod strings 502, 504 via one or more acoustic signals.

Thus, the first rod string 502 and the second rod string 504 provide for wireless communication (e.g., communication without the use of a cable such as a wireline cable) between the first tool 519 and the surface via the respective repeaters 512, 514, 516, 518, 520, 522, 524, 526 and the rods 517, 525 of the first and second rod strings 502, 504. In some examples, the eighth repeater 524 provides a wireless interface for the second tool 527 and serves as a repeater for transmitting data between the first rod string 502 and the surface. The rods 517, 525 and, in some examples, fluid in the wellbore 506, serve as propagation media for transmitting the acoustic signal including the first message between the first tool 519, the repeaters of the rod strings 502, 504, and the surface repeater 528 and across the first and second plugs 508, 510.

Similarly, data collected by the second tool 527 can be conveyed to the surface via the second rod string 504 and the surface repeater 528 via one or more acoustic signals. In the example system 500, an acoustic signal including a second message containing pressure data collected by the second tool 527 is wirelessly transmitted along the second rod string 504 between the fifth, sixth, seventh, and eighth repeaters 520, 522, 524, 526 as represented by the arrows 540 of FIG. 5. The rods 525 of the second rod string 504 serve as propagation media for transmitting the acoustic signal including the second acoustic message between the repeaters 520, 522, 524, 526 of the second rod string 504 and to the surface repeater 528. Fluid in the wellbore 506 can also serve as a propagation medium for transmitting the acoustic signal across the second plug 510. The signal data including the pressure data collected by the second tool 527 is transmitted from the surface repeater 528 to the surface computer 534 for processing and analysis. In some examples, the surface computer 534 generates one or more instructions for the second tool 527 that are transmitted downhole via the surface repeater 528 and the repeaters of the first and/or second rod strings 502, 504 via one or more acoustic signals. In some examples, the transmission of data between the first tool 519 and the surface computer 534 and the second tool 527 and the surface computer 534 is substantially simultaneous.

Thus, data regarding the pressure conditions in the suspended wellbore 506 can be obtained at the surface via the example system 500 despite the removal of production tubing from the wellbore 506. The first and second rod strings 502, 504 provide an alternative to deploying production tubing or drill pipe as signal propagation media for the transmission of acoustic signals containing messages between the repeaters 512, 514, 516, 518, 520, 522, 524, 526 and. The data collected by the first and second tools 519, 527 with respect to pressure conditions in the wellbore 506 above and below the first plug 508 can be analyzed to, for example, check an integrity of the first plug 508 in preventing leaks. The wireless communication network formed by the repeaters of the first and second rod strings 502, 504 and conveying the messages via the rods of the rod strings 502, 504 provide efficient means of monitoring conditions in the suspended wellbore 506 as compared to, for example, conducting interference testing using two wells or deploying production tubing in the suspended wellbore 506.

Figure 6:
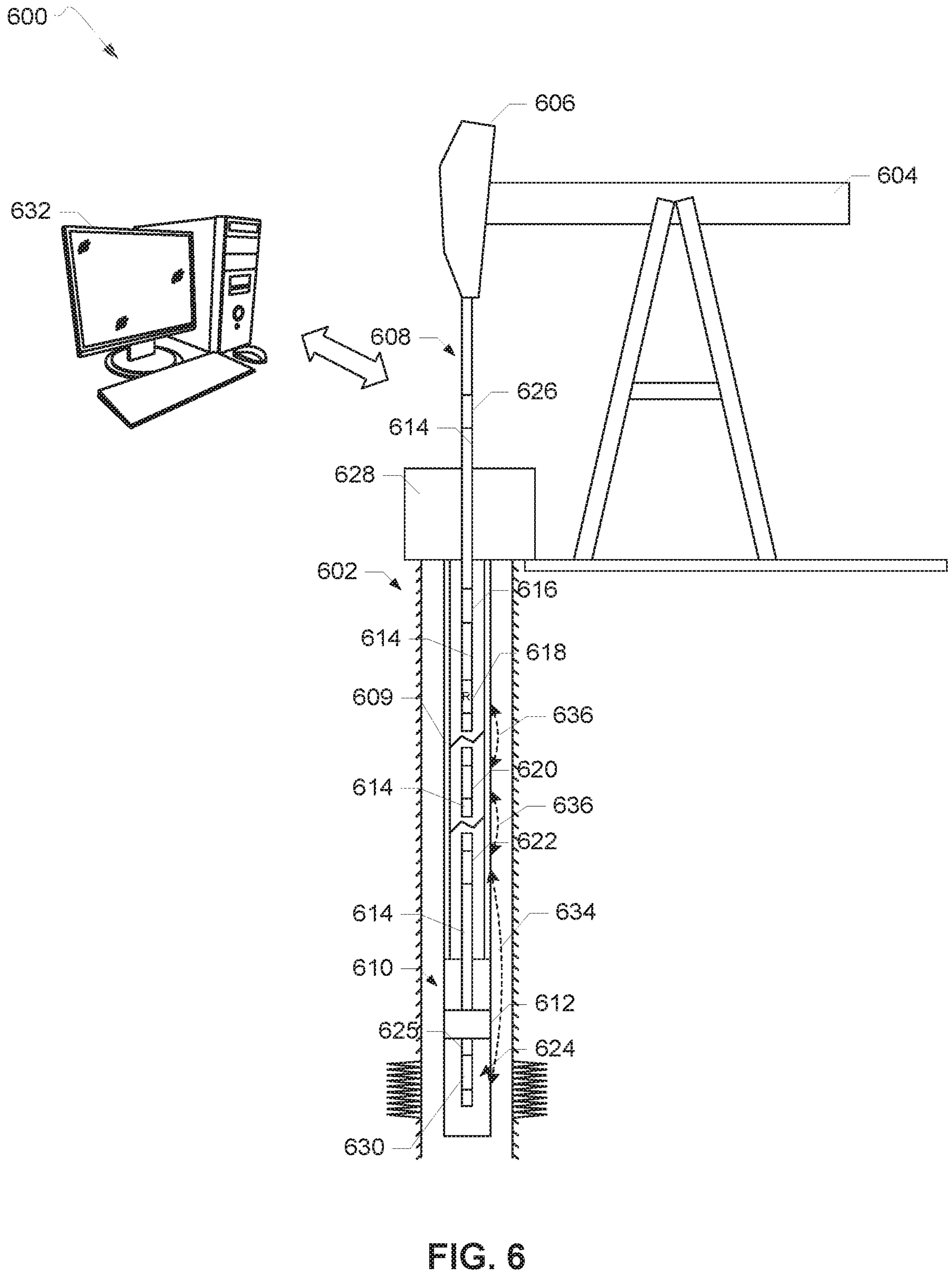
FIG. 6 illustrates a second example wireless acoustic telemetry system in accordance with the teachings disclosed herein.

FIG. 6 illustrates a second example wireless acoustic telemetry system 600 for monitoring a sucker rod pump disposed in a wellbore 602. In the example system 600, a walking beam 604 at the surface includes a horsehead 606 coupled thereto. The horsehead 606 is coupled to a sucker rod string 608. The sucker rod string 608 extends from the horsehead 606 into the wellbore 602. In the example system 600 of FIG. 6, the sucker rod string 608 is disposed in production tubing 609 disposed in the wellbore 602. The sucker rod string 608 is coupled to a sucker rod pump 610 disposed in the wellbore 602. In the example system 600 of FIG. 6, the sucker rod string 608 is mechanically coupled to a plunger 612 of the sucker rod pump 610.

In the example system 600 of FIG. 6, the sucker rod string 608 serves as a communication channel for enabling communication with one or more tools disposed in the wellbore 602. The example sucker rod string 608 of FIG. 6 includes a plurality of rods 614. In the example sucker rod string 608 of FIG. 6, the rods 614 are metal rods. The rods 614 can include other material capable of propagating acoustic signals. In some examples, two or more of the rods 614 are coupled substantially as disclosed above in connection with FIG. 4 (e.g., via a male-to-female connection).

The example sucker rod string 608 also includes one or more acoustic repeaters mechanically coupled to the sucker rod string 608. As illustrated in FIG. 6, the example sucker rod string 608 includes a first repeater 616, a second repeater 618, a third repeater 620, and a fourth repeater 622. The first, second, third, and/or fourth repeaters 616, 618, 620, 622 can be implemented using the example repeater 100 of FIG. 1. Each of the first, second, third, and fourth repeaters 616, 618, 620, 622 is coupled to the rods 614 of the sucker rod string 608 in an in-line configuration substantially as disclosed above in connection with FIGS. 2A and 2B or an in-parallel configuration substantially as disclosed above in FIGS. 3A and 3B. The example sucker rod string 608 of FIG. 6 also includes a surface repeater 626 coupled to the sucker rod string 608 at the surface (e.g., in the in-line configuration of FIGS. 2A and 2B or an in-parallel configuration of FIGS. 3A and 3B). In other examples, the surface repeater 626 is coupled to surface control pressure equipment 628 disposed at the surface (e.g., as disclosed above in connection with the surface equipment 530 of FIG. 5). The example sucker rod string 608 of FIG. 6 can include additional and/or fewer repeaters coupled to the rods 614 of the sucker rod string 608.

In the example system 600, a fifth repeater 624 is disposed below the plunger 612 (relative to the surface). The fifth repeater 624 of FIG. 6 can be implemented using the example repeater 100 of FIG. 1. The fifth repeater 624 can be coupled to one or more rods 625 (e.g., metal rods) in an in-line configuration or an in-parallel configuration as disclosed above in connection with FIGS. 2 and 3. As illustrated in FIG. 6, one of the rods 625 can be mechanically coupled or disposed proximate to the plunger 612. In the example system 600, the fifth repeater 624 is interfaced with a tool 630 such that the tool 630 is a wireless-enabled tool. In the example system 600 of FIG. 6, the tool 630 is a pressure gauge. In other examples, the fifth repeater 624 interfaces with another type of sensor (e.g., a temperature sensor) for monitoring downhole conditions and/or the health of the pump 610.

In the example system 600, the rod(s) 625 to which the fifth repeater 624 is coupled and the rods 614 of the sucker rod string 608 serve as transmission media to enable communication between the tool 630, the surface repeater 626, and a surface computer 632. For example, pressure data collected by the tool 630 is wirelessly transmitted in the form of one or more acoustic signals from the fifth repeater 624 to the fourth repeater 622, as represented by arrow 634 of FIG. 6. The rods 625 associated with the fifth repeater 624 and the rods 614 of the sucker rod string 608 serve as propagation media for transmitting the acoustic signal(s) across the plunger 612.

The rods 614 of the sucker rod string 608 propagate the acoustic signals(s) containing the pressure data from the tool 630 along the sucker rod string 608 between the first, second, third, and fourth repeaters 616, 618, 620, 622, as represented by arrows 636 of FIG. 6. In some examples, fluid in the wellbore 602 also serves as propagation medium for transmitting the acoustic signal(s). The acoustic signal(s) are wirelessly transmitted along the sucker rod string 608 and are received by the surface repeater 626.

The surface repeater 626 transmits the signal data to the computer 632. In the example system 600, the surface repeater 626 is wirelessly coupled to the computer 632 via, for example, a WiFi connection. During operation of the sucker rod pump 610, the sucker rod string 608 moves. The wireless connection between the surface repeater 626 and the computer 632 substantially eliminates the need for a cable extending between the sucker rod string 608 and the computer 632 and, thus, reduces the risk of damage or wear to the cable due to movement of the sucker rod string 608. In other examples, the surface repeater 626 transmits the message(s) to the computer 632 via a wired connection. The computer 632 processes the data collected by the tool 630 and transmitted via the sucker rod string 608. In some examples, the computer 632 generates one or more instructions for the tool 630 that are transmitted downhole via the surface repeater 626 and the repeaters of the sucker rod string 608.

Thus, in the example system 600, the substantially continuous solid connection provided by the sucker rod string 608 between the downhole plunger and the surface serves as a transmission medium for relaying acoustic signals containing messages between the surface and one or more downhole tools (e.g., the tool 630). The coupling of the repeaters 616, 618, 620, 622 to the sucker rod string 608 substantially eliminates the need to deploy a telemetry cable downhole in addition to the sucker rod string 608. Rather, in the example system 600, the sucker rod string 608 is used to facilitate communication between downhole tool(s) and the surface and convey data between the tool(s) and the surface.

While an example manner of implementing the example rod strings 200, 300 of FIGS. 2 and 3 and/or the wireless acoustic telemetry systems 500, 600 are illustrated in FIGS. 1-6, one or more of the elements, processes and/or devices illustrated in FIGS. 1-6 may be combined, divided, re-arranged, omitted, eliminated and/or implemented in any other way. Further, the example repeaters 100, 512, 514, 516, 518, 520, 522, 524, 526, 528, 616, 618, 620, 622, 624, 626 (including, e.g., the example transducer 102, the example electronics 112, the example power source 114, etc. of the example repeater 100 of FIG. 1), the example tools 519, 527, 630, the example sucker rod pump 610, the example plunger 612, the example surface equipment 530, 628, the example computer 534, 632 and/or, more generally, the example rod strings 200, 300 of FIGS. 2 and 3 and/or the wireless acoustic telemetry systems 500, 600 of FIGS. 1-6 may be implemented by hardware, software, firmware and/or any combination of hardware, software and/or firmware. Thus, for example, any of the example repeaters 100, 512, 514, 516, 518, 520, 522, 524, 526, 528, 616, 618, 620, 622, 624, 626 (including, e.g., the example transducer 102, the example electronics 112, the example power source 114, etc. of the example repeater 100 of FIG. 1), the example tools 519, 527, 630, the example sucker rod pump 610, the example plunger 612, the example surface equipment 530, 628, the example computer 534, 632 and/or, more generally, the example rod strings 200, 300 of FIGS. 2 and 3 and/or the wireless acoustic telemetry systems 500, 600 of FIGS. 1-6 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example repeaters 100, 512, 514, 516, 518, 520, 522, 524, 526, 528, 616, 618, 620, 622, 624, 626 (including, e.g., the example transducer 102, the example electronics 112, the example power source 114, etc. of the example repeater 100 of FIG. 1), the example tools 519, 527, 630, the example sucker rod pump 610, the example plunger 612, the example surface equipment 530, 628, the example computer 534, 632 and/or, more generally, the example rod strings 200, 300 of FIGS. 2 and 3 and/or the wireless acoustic telemetry systems 500, 600 of FIGS. 1-6 is/are hereby expressly defined to include a tangible computer readable storage device or storage disk such as a memory, a digital versatile disk (DVD), a compact disk (CD), a Blu-ray disk, etc. storing the software and/or firmware. Further still, the example rod strings 200, 300 of FIGS. 2 and 3 and/or the wireless acoustic telemetry systems 500, 600 of FIGS. 1-6 may include one or more elements, processes and/or devices in addition to, or instead of, those illustrated in FIGS. 1-6, and/or may include more than one of any or all of the illustrated elements, processes and devices.

Figure 7:
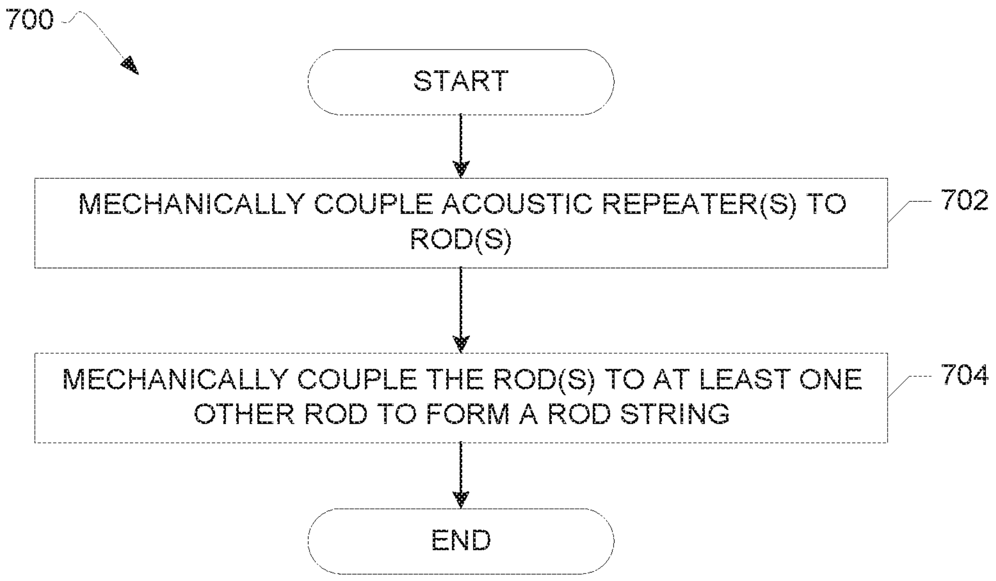
FIG. 7 is a first flow diagram of an example method that may be executed to implement the example systems of FIGS. 5 and 6.

FIG. 7 illustrates a flowchart representative of an example method 700 for producing a rod string having one or more acoustic repeaters coupled thereto. The rod string produced via the example method 700 can be implemented as part of the example system 500 of FIG. 5 and/or the example system 600 of FIG. 6. The example method 700 includes mechanically coupling an acoustic repeater to a rod (block 702). The acoustic repeater can be, for example, any of the example acoustic repeaters 100, 512, 514, 516, 518, 520, 522, 524, 526, 528, 616, 618, 620, 622, 624, 626 of FIGS. 1, 5, and 6. The rod can include any of the rods 204, 206, 208, 210, 306, 308, 310, 312, 400, 402, 517, 525, 614, 625 of FIGS. 2-5. In the example method 700, the mechanical coupling of the acoustic repeater(s) to the rod(s) can include coupling the acoustic repeater(s) to the rod(s) in an in-line configuration as disclosed above in connection with the example rod string 200 of FIGS. 2A and 2B. For example, as illustrated in FIG. 2B, the male connector 212 of the second rod 206 of the example rod string 200 is coupled to the female connector 216 of the example acoustic repeater 100. Also, the male connector 220 of the third rod 208 of the example rod string 200 is coupled to the female connector 224 of the example repeater 100 such that the example repeater 100 is disposed between or substantially aligned with the second and third rods 206, 208 and the face 108 of the transducer 102 is in substantially direct contact with the second rod 206. In other examples, the example method 700 includes mechanically coupling the repeater(s) to the rod(s) in an in-parallel configuration as disclosed above in connection with FIGS. 3A and 3B. For example, as illustrated in FIGS. 3A and 3B, the example repeater 100 is coupled to the third rod 308 of the example rod string 300 via the clamp 314. The first male connector 324 of the example repeater 100 is coupled to the first female connector 320 of the first clamp portion 316 and the second male connector 328 of the example repeater 100 is coupled to the second female connector 322 of the second clamp portion 318. Thus, the example repeater 100 is substantially parallel to the third rod 308 of the example rod string 300 of FIGS. 3A and 3B.

The example method 700 includes mechanically coupling the rod to at least one other rod to form a rod string (block 704). For example, as illustrated in FIG. 4, the first rod 400 and the second rod 402 can be coupled via a male-to-female connection such that a cross section of the rod string including the first rod 400 and the second rod 402 is substantially uniform at the portion of the rod string where the first and second rods 400, 402 are coupled relative to a remainder of the rod string.

Figure 8:
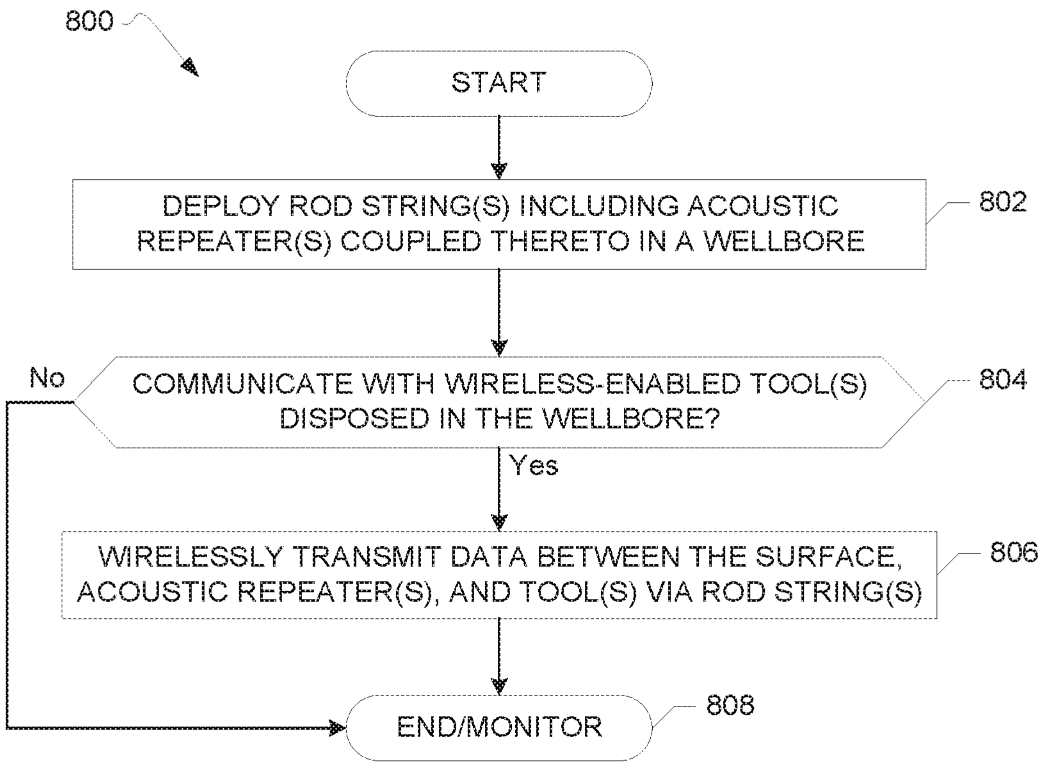
FIG. 8 is a second flow diagram of an example method that may be executed to implement the example systems of FIGS. 5 and 6.

FIG. 8 illustrates a flow chart representative of an example method 800 that can be implemented to communicate with a wireless-enabled tool disposed in a wellbore. The wireless-enabled tool can be a tool that is not communicatively coupled to, for example, a wireline cable. The wireless-enabled tool can be, for example, any of the tools 519, 527, 630 of the example system 500 of FIG. 5 or the example system 600 of FIG. 6. Although the example method 800 is disclosed below in connection with communication in a wellbore, the example method 800 can be implemented in other examples involving communication between a tool and a computer.

The example method 800 begins with deploying a rod string including one or more acoustic repeaters coupled thereto in a wellbore (block 802). For example, as illustrated in the example system 500 of FIG. 5, the first rod string 502 including the repeaters 512, 514, 516, 518 coupled thereto and the second rod string 504 including the repeaters 520, 522, 524, 526 coupled thereto are disposed in the wellbore 506. The repeaters 512, 514, 516, 518 can be coupled to the rods 517 of the first example rod string 502 and the repeaters 520, 522, 524, 526 can be coupled to the rods 525 of the second example rod string 504 as disclosed above in connection with the example method 700 of FIG. 7 (e.g., in an in-line or an in-parallel configuration). One or more of the rods 517 of the first example rod string 502 and/or the rods 525 of the second example rod string 504 can be coupled to another rod of the respective rod strings 502, 504 as substantially disclosed above in connection with the example method 700 of FIG. 7 (e.g., via a male-to-female connection between the rods). In some examples of the example method 800, the rod string(s) are disposed below one or more obstructions, such as the plugs 508, 510 of FIG. 5. In other examples, the rod string(s) extend from the surface, such as the sucker rod string 608 of the example system 600 of FIG. 6 having the repeaters 616, 618, 620, 624, 626 coupled thereto.

The example method 800 includes a decision whether or not to communicate with a wireless-enabled tool disposed in the wellbore (block 804). For example, the first tool 519 of the example system 500 of FIG. 5 is interfaced with the fourth repeater 518 of the first example rod string 502. In some examples, a decision is made to obtain data collected by the tool 519 about downhole conditions such as pressure or temperature. As another example, a decision may be made to obtain data about downhole conditions such as pressure below the plunger 612 of the sucker pump 610 via the wireless-enabled tool 630 of the example system 600 of FIG. 6.

If a decision is made to communicate with a wireless-enabled tool disposed in the wellbore, the example method 800 includes wirelessly transmitting data between the surface, the acoustic repeater(s), and the tool(s) via the rod string(s) (block 806). For example, an acoustic signal including data collected by the first tool 519 of the example system 500 of FIG. 5 can be transmitted between the first, second, third, and fourth repeaters 512, 514, 516, 518 by the rods 517 of the first rod string 502. The acoustic signal can be transmitted to the surface via the second rod string 504 and the surface repeater 528 for processing by the surface computer 534. The surface computer 534 can transmit instructions (e.g., in the form of signals) to the first tool 519 via the first and second rod strings 502, 504 of FIG. 5. As another example, an acoustic signal including data collected by the tool 630 of the example system 600 can be transmitted between the fifth repeater 624 interfaced with the tool 630 and the repeaters 616, 618, 620, 622, 626 of the sucker rod string 608. The data transmitted to the surface via the sucker rod string 608 can be processed by the surface computer 632 of FIG. 6. The surface computer 632 can transmit instructions to the tool 630 via the sucker rod string 608, the rods 625, and the fifth repeater 624 of FIG. 6 via one or more signals.

The example method 800 ends with continued monitoring of the tool(s) disposed downhole via, for example, wireless acoustic communication between the repeaters, the tool(s), and the surface enabled by the rod string(s) (block 808). Also, if a decision is made not to communicate with the wireless-enabled tool(s) disposed in the wellbore (e.g., based on periodic monitoring schedule of a suspended wellbore), the example method 800 ends.

The flowcharts of FIGS. 7 and 8 are representative of example methods that may be used to implement the example systems 500, 600 of FIGS. 5 and 6. In these examples, the methods may be implemented using machine-readable instructions that comprise a program for execution by a processor such as the processor 812 shown in the example processor platform 800, discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIGS. 7 and 8, many other methods of implementing the example systems 500, 600 of FIGS. 5 and 6 may alternatively be used. For example, the order of execution of the blocks may be changed, and/or some of the blocks described may be changed, eliminated, or combined.

As mentioned above, the example processes of FIGS. 7 and 8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 7 and 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 9:
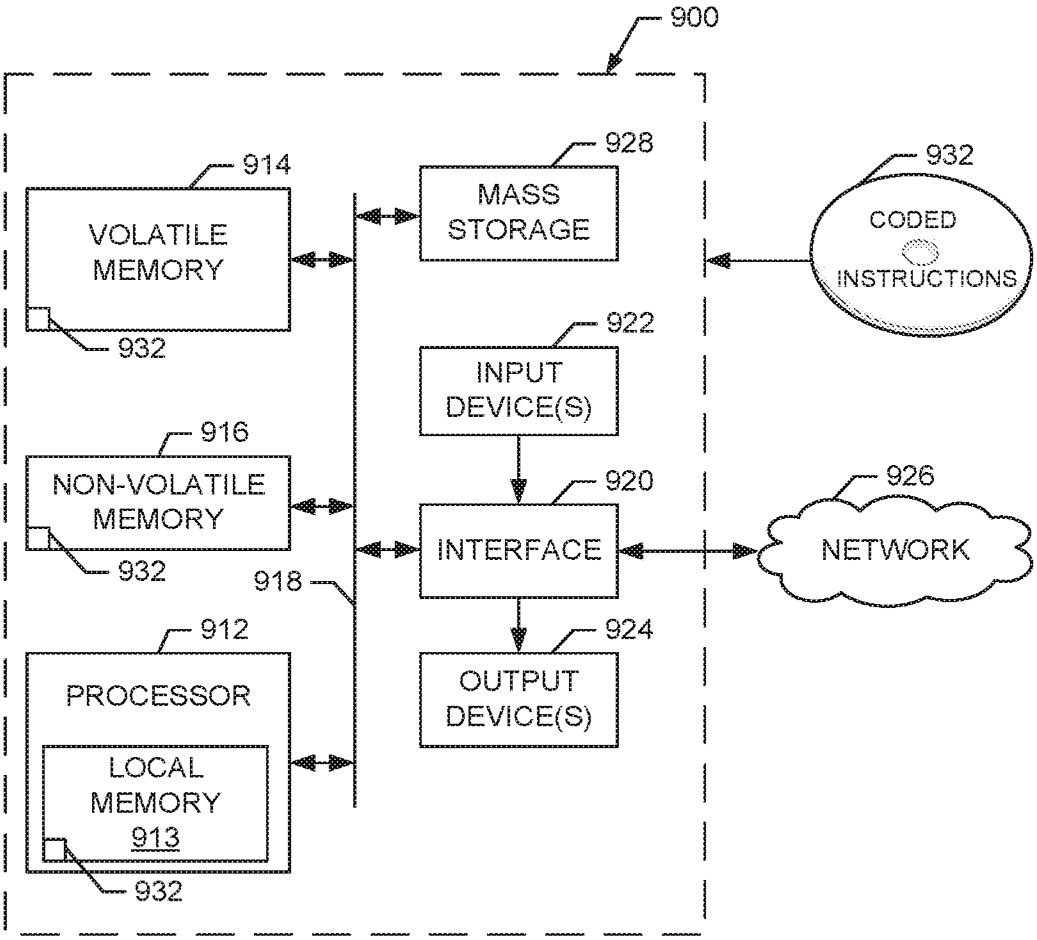
FIG. 9 is a diagram of a processor platform that may be used to carry out the example methods of FIGS. 7 and 8 and/or, more generally, to implement the example systems of FIGS. 5 and 6.

FIG. 9 is a block diagram of an example processor platform 900 capable of executing instructions to implement the processes of FIGS. 7 and 8 and the example systems 500, 600 of FIGS. 5 and 6. The processor platform 900 can be, for example, a server, a personal computer, a mobile device (e.g., a cell phone, a smart phone, a tablet such as an iPad™), a personal digital assistant (PDA), an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

Coded instructions 932 of FIG. 9 may be stored in the mass storage device 928, in the volatile memory 914, in the non-volatile memory 916, and/or on a removable tangible computer readable storage medium such as a CD or DVD.

From the foregoing, it will be appreciated that the above disclosed apparatus, systems, and methods provide for wireless acoustic communication between the surface and one or more wireless-enabled tools disposed downhole via a rod string including one or more acoustic repeaters coupled thereto. Disclosed example rod strings enable wireless communication between the tool(s) and the surface in examples in which a wellbore does not include production piping and/or other materials to serve as a signal transmission medium, such as wellbores that have been suspended from production. Other disclosed examples extend the communicative capabilities of rod strings that are deployed during routine operations using repeaters, such as sucker rod strings, for efficient downhole communication. Disclosed examples provide for coupling of an acoustic repeater to one or more rods of the rod string via mechanical connections to facilitate transmission of one or more acoustic signals. Disclosed examples also provide for coupling of two rods that substantially reduces interference with the transmission of the acoustic signal(s) along the rod string from, for example, echoes.

An example apparatus includes a first rod and a second rod. The first rod and the second rod are to form a rod string. The example apparatus includes a first acoustic repeater mechanically coupled to the first rod. The first acoustic repeater is to communicate with a second acoustic repeater to convey data via the rod string. The second acoustic repeater is to receive the data from a first tool.

In some examples, the first acoustic repeater is coupled to the first rod via a first connector at a first end of the first acoustic repeater and the second rod via a second connector at a second end of the first acoustic repeater opposite the first end.

In some examples, the first acoustic repeater is coupled to the first rod via a clamp.

In some examples, the clamp includes a first clamp portion and a second clamp portion. A first end of the first acoustic repeater is to couple to the first rod via the first clamp portion and a second end of the first acoustic repeater to couple to the first rod via the second clamp portion.

In some examples, the first rod includes a male connector and the second rod includes a female connector. The male connector is to couple to the female connector to couple the first rod and the second rod.

In some examples, the rod string is a first rod string and the example apparatus further includes a second rod string. The second rod string includes a third acoustic repeater. In such examples, at least one of the firs acoustic repeater or the second acoustic repeater is to communicate with the third acoustic repeater to convey the data.

In some examples, the first acoustic repeater includes a transducer. In such examples, a face of the transducer is to be substantially in contact with the first rod when the first acoustic repeater is coupled to the first rod.

In some examples, the first tool is disposed below an obstruction relative to a surface when the first acoustic repeater is disposed in a wellbore.

In some examples, the apparatus further includes a third acoustic repeater disposed at a surface when the first acoustic repeater is disposed in a wellbore. The third acoustic repeater is coupled to the rod string.

In some examples, the first rod includes a metal material.

An example method includes deploying, by executing an instruction with a processor, a rod string in a wellbore, the rod string including a first acoustic repeater. The example method includes communicating, by executing an instruction with the processor and via the first acoustic repeater, with a second acoustic repeater, the second acoustic repeater associated with a first tool disposed in the wellbore. The second acoustic repeater is to transmit first data to the first acoustic repeater via the rod string. The example method includes transmitting, by executing an instruction with the processor, the first data from the first acoustic repeater to the processor.

In some examples, the method further includes coupling the rod string to an obstruction. The first acoustic repeater is to be disposed below obstruction relative to a surface when the rod string is deployed in the wellbore.

In some examples, the method further includes coupling the rod string to a plunger. In such examples, the first tool is to be disposed below the plunger relative to a surface when the first tool is disposed in the wellbore.

In some examples, the rod string is a first rod string and the method further includes deploying a second rod string including a third acoustic repeater in the wellbore and transmitting data between the first acoustic repeater and the third acoustic repeater via the first rod string and the second rod string.

In some examples, the method further includes transmitting data between the first acoustic repeater and the processor via the second rod string.

In some examples, the method further includes transmitting second data between the third acoustic repeater and the processor. In such examples, the second data is to be collected by a second tool associated with the third acoustic repeater.

An example method includes mechanically coupling an acoustic repeater to a first rod. The example method includes mechanically coupling the first rod to a second rod. In the example method, the first rod is to propagate a signal associated with the acoustic repeater to the second rod via the coupling of the acoustic repeater and the first rod and the coupling of the first rod and the second rod.

In some examples, the method further includes mechanically coupling the acoustic repeater to the first rod via a threaded connection.

In some examples, the method further includes mechanically coupling a first end of the acoustic repeater to the first rod and a second end of the acoustic repeater to a third rod.

In some examples, the method further includes mechanically coupling the acoustic repeater to the first rod via a clamp.

In the specification and appended claims: the terms "connect," "connection," "connected," "in connection with," and "connecting" are used to mean "in direct connection with" or "in connection with via one or more elements" or connected via one or more communication means. Further, the terms "couple," "coupling," "coupled," "coupled together," and "coupled with" are used to mean "directly coupled together" or "coupled together via one or more elements" or communicatively coupled. As used herein, the terms "above" and "below" and other like terms indicating relative positions above or below a given point or element are used in this description to more clearly describe some embodiments of the disclosure.

The foregoing outlines features of several embodiments so that those skilled in the art may better understand aspects of the present disclosure. Those skilled in the art should appreciate that they may readily use the present disclosure as a basis for designing or modifying other processes and structures for carrying out the same purposes or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

Although the preceding description has been described herein with reference to particular means, materials and embodiments, it is not intended to be limited to the particulars disclosed herein; rather, it extends to all functionally equivalent structures, methods, and uses, such as are within the scope of the appended claims.

The invention claimed is:

1. An apparatus comprising:

a first rod;

a second rod, the first rod and the second rod to form a rod string; and a first acoustic repeater mechanically coupled to the first rod, the first acoustic repeater to communicate with a second acoustic repeater to convey data via the rod string, the second acoustic repeater to receive the data from a first tool, wherein the rod string is a first rod string and further including a second rod string, the second rod string including a third acoustic repeater, at least one of the first acoustic repeater or the second acoustic repeater to communicate with the third acoustic repeater to convey the data.

2. The apparatus of claim 1, wherein the first acoustic repeater is coupled to the first rod via a first connector at a first end of the first acoustic repeater and the second rod via a second connector at a second end of the first acoustic repeater opposite the first end.

3. The apparatus of claim 1, wherein the first acoustic repeater is coupled to the first rod via a clamp.

4. The apparatus of claim 3, wherein the clamp includes a first clamp portion and a second clamp portion, a first end of the first acoustic repeater to couple to the first rod via the first clamp portion and a second end of the first acoustic repeater to couple to the first rod via the second clamp portion.

5. The apparatus of claim 1, wherein the first rod includes a male connector and the second rod includes a female connector, the male connector to couple to the female connector to couple the first rod and the second rod.

6. The apparatus of claim 1, wherein the first rod includes a metal material.

7. The apparatus of claim 1, wherein the first acoustic repeater includes a transducer, a face of the transducer to be substantially in contact with the first rod when the first acoustic repeater is coupled to the first rod.

8. The apparatus of claim 1, wherein the first tool is disposed below an obstruction relative to a surface when the first acoustic repeater is disposed in a wellbore.

9. The apparatus of claim 1, further including a fourth acoustic repeater disposed at a surface when the first acoustic repeater is disposed in a wellbore, the fourth acoustic repeater coupled to the rod string.

10. A method comprising:

deploying a first rod string in a wellbore, the first rod string including a first acoustic repeater;

communicating, by executing an instruction with a processor and via the first acoustic repeater, with a second acoustic repeater, the second acoustic repeater associated with a first tool disposed in the wellbore, the second acoustic repeater to transmit first data to the first acoustic repeater via the first rod string;

transmitting, by executing an instruction with the processor, the first data from the first acoustic repeater to the processor deploying a second rod string including a third acoustic repeater in the wellbore; and transmitting data between the first acoustic repeater and the third acoustic repeater via the first rod string and the second rod string.

11. The method of claim 1, further including transmitting second data between the third acoustic repeater and the processor, the second data to be collected by a second tool associated with the third acoustic repeater.

12. The method of claim 10, further including coupling the rod string to an obstruction, the first acoustic repeater to be disposed below obstruction relative to a surface when the rod string is deployed in the wellbore.

13. The method of claim 10, further including coupling the rod string to a plunger, the first tool to be disposed below the plunger relative to a surface when the first tool is disposed in the wellbore.

14. The method of claim 1, further including transmitting data between the first acoustic repeater and the processor via the second rod string.

* * * * *